Patented May 19, 1925.

1,538,076

UNITED STATES PATENT OFFICE.

JOHN YOUNG, OF CALDWELL, NEW JERSEY, ASSIGNOR TO NATIONAL ANILINE & CHEMICAL COMPANY, INC., OF NEW YORK, N. Y., A CORPORATION OF NEW YORK.

VULCANIZATION OF RUBBER.

No Drawing.  Application filed July 8, 1922. Serial No. 573,743.

*To all whom it may concern:*

Be it known that I, JOHN YOUNG, a subject of the King of Great Britain, residing at Caldwell, in the county of Essex, State of New Jersey, have invented certain new and useful Improvements in the Vulcanization of Rubber; and I do hereby declare the following to be a full, clear, and exact description of the invention, such as will enable others skilled in the art to which it appertains to make and use the same.

This invention relates to improvements in the vulcanization of rubber.

The invention is based upon the discovery that the desired vulcanization of rubber will take place in a shorter time and with a production of vulcanized products of improved properties by carrying out the vulcanization with the addition of a small amount of di-tolyl-substituted guanidines. The pure ditolyl-substituted guanidines can be used, for example, di-orthotolylguanidine or di-paratolylguanidine; but these different guanidine derivatives have approximately the same accelerating power and can advantageously be used in admixture with each other. The di-tolyl-substituted guanidines can advantageously be made from so-called "low para cuts" obtained in conjunction with the manufacture of para-nitrotoluene and composed of a mixture consisting chiefly of ortho-nitrotoluene (around 85 to 95%) and para-nitrotoluene (around 3 to 15%), together with small amounts of meta-nitrotoluene and possible other nitro bodies. Upon subjecting this mixture to reduction there is produced a mixture of the corresponding amines and this mixture can be employed in the production of the ditolyl-substituted guanidines giving a resulting composite product containing di-orthotolylguanidine as its principal constituent. For example, the composite product may contain di-ortho-tolylguanidine (85 to 95%) di-para-tolylguanidine (3 to 15%) and di-meta-tolylguanidine (0 to 12%). Mixed ditolyl-substituted guanidines, that is unsymmetrical ditolylguanidines such as orthotolyl-para-tolyl-guanidine, can also be used, and may be present to a greater or less extent in the mixture above referred to.

In carrying out the process of the present invention the tolyl derivatives of guanidine are incorporated with the rubber prior to vulcanization along with sulphur, zinc oxide, etc. The mixtures with which the tolyl guanidines are compounded may vary greatly in character and may contain added pigments, fillers, softeners, inorganic accelerators, etc. The vulcanization can be carried out in the usual way by heating the mixture to the vulcanization temperature for a sufficient time. The vulcanization proceeds quickly and smoothly and it is possible to obtain an improved, soft or hard vulcanized rubber product.

The invention will be further illustrated by the following examples, the parts being by weight:

Example 1. 100 parts of first latex plantation rubber is mixed with 100 parts zinc oxide, 4 parts of sulfur, and 1 part of di-orthotolylguanidine, and heated in a vulcanizing press at a temperature (about 140° C.) corresponding to a steam pressure of about 40 pounds per square inch, until the compounded product is suitably vulcanized, which requires about 30 minutes.

Example 2. 100 parts of first latex plantation rubber is mixed with 4 parts zinc oxide, 4 parts of sulfur, and 1 part of di-para-tolylguanidine, and heated in a vulcanizing press at a temperature (about 140° C.) corresponding to a steam pressure of 40 pounds per square inch until the compounded product is suitably vulcanized, which requires about 30 minutes.

The vulcanized products have superior physical properties such as increased tensile strength, resistance to deterioration, improved elasticity and resiliency, freedom from bloom, etc.

It will be understood that the amount of ditolyl substituted guanidines employed can be varied somewhat with the particular mixture and with the amount of sulphur used, as well as the nature of product desired, e. g., whether a hard vulcanized product or a soft cure. It is one advantage of the invention that it enables the amount of sulphur to be reduced, thus giving improved results in connection with the production of soft vulcanized rubber products.

I claim:

1. The method of promoting the vulcanization of rubber which comprises incorporating with the rubber a small amount of a mixture of ditolyl substituted guanidines including di-orthotolylguanidine and diparatolylguanidine in which the orthotolylguanidine predominates together with other compounding ingredients and vulcanizing the resulting mixture.

2. The method of promoting the vulcanization of rubber which comprises incorporating with the rubber a small amount of a mixture of ditolyl substituted guanidines including di-orthotolylguanidine and diparatolylguanidine in which the orthotolylguanidine predominates together with sulfur and zinc oxide and vulcanizing the resulting mixture.

3. The method of promoting the vulcanization of rubber which comprises incorporating with the rubber a small amount of a mixture of ditolyl substituted guanidines including di-orthotolylguanidine, diparatolylguanidine and dimetatolylguanidine in which the ortho-tolylguanidine predominates, together with other compounding ingredients, and vulcanizing the resulting mixture.

4. The method of promoting the vulcanization of rubber which comprises incorporating with the rubber a small amount of a mixture of ditolyl substituted guanidines including di-orthotolylguanidine, diparatolylguanidine and dimetatolylguanidine in which the ortho-tolylguanidine predominates, together with sulfur and zinc oxide, and vulcanizing the resulting mixture.

5. The method of promoting the vulcanization of rubber which comprises incorporating with the rubber a small amount of a mixture of ditolyl substituted guanidines including unsymmetrical ditolylguanidines together with other compounding ingredients and vulcanizing the resulting mixture.

6. The method of promoting the vulcanization of rubber which comprises incorporating with the rubber a small amount of a mixture of ditolyl substituted guanidines including unsymmetrical ditolylguanidines together with sulfur and zinc oxide, and vulcanizing the resulting mixture.

7. The method of promoting the vulcanization of rubber which comprises incorporating with the rubber a small amount of a mixture of ditolyl substituted guanidines including orthotolylparatolylguanidine together with other compounding ingredients and vulcanizing the resulting mixture.

8. The method of promoting the vulcanization of rubber which comprises incorporating with the rubber a small amount of a mixture of ditolyl substituted guanidines including orthotolylparatolylguanidine together with sulfur and zinc oxide and vulcanizing the resulting mixture.

9. The method of promoting the vulcanization of rubber which comprises incorporating with the rubber a small amount of an unsymmetrical ditolyl substituted guanidine together with other compounding ingredients and vulcanizing the resulting mixture.

10. The method of promoting the vulcanization of rubber which comprises incorporating with the rubber a small amount of an unsymmetrical ditolyl substituted guanidine together with sulfur and zinc oxide and vulcanizing the resulting mixture.

11. Vulcanized rubber products vulcanized with the addition of a small amount of a mixture including di-orthotolylguanidine and diparatolylguanidine in which the orthotolylguanidine predominates.

12. Vulcanized rubber products vulcanized with the addition of a small amount of a mixture including di-orthotolylguanidine, diparatolylguanidine and dimetatolylguanidine in which the orthotolylguanidine predominates.

13. Vulcanized rubber products vulcanized with the addition of a small amount of a mixture of ditolyl substituted guanidines including an unsymmetrical ditolyl substituted guanidine.

14. Vulcanized rubber products vulcanized with the addition of a small amount of a mixture of ditolyl substituted guanidines including orthotolylparatolylguanidine.

15. Vulcanized rubber products vulcanized with the addition of a small amount of an unsymmetrical ditolyl substituted guanidine.

In testimony whereof I affix my signature.

JOHN YOUNG.